(12) United States Patent
Schaeffer

(10) Patent No.: US 10,968,046 B2
(45) Date of Patent: Apr. 6, 2021

(54) CASCADE CONVEYOR AND METHOD FOR SORTING AND CONVEYING CONTAINER CLOSURES

(71) Applicant: KRONES AG, Neutraubling (DE)

(72) Inventor: Tobias Schaeffer, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/719,505

(22) Filed: Dec. 18, 2019

(65) Prior Publication Data

US 2020/0189858 A1 Jun. 18, 2020

(30) Foreign Application Priority Data

Dec. 18, 2018 (DE) .................... 10 2018 132 637.8

(51) Int. Cl.
| | |
|---|---|
| *B65G 47/22* | (2006.01) |
| *B65G 15/30* | (2006.01) |
| *B65G 15/44* | (2006.01) |
| *B65G 15/42* | (2006.01) |
| *B65G 47/256* | (2006.01) |
| *B07C 5/02* | (2006.01) |
| *B65G 47/14* | (2006.01) |
| *B67B 3/064* | (2006.01) |

(52) U.S. Cl.
CPC ............. *B65G 47/256* (2013.01); *B07C 5/02* (2013.01); *B65G 47/1471* (2013.01); *B65G 47/1492* (2013.01); *B67B 3/0645* (2013.01); *B65G 2201/0235* (2013.01)

(58) Field of Classification Search
None
See application file for complete search history.

(56) References Cited

U.S. PATENT DOCUMENTS

| 2,916,133 A | 12/1959 | Copping |
| 3,835,985 A | 9/1974 | Johnson |
| (Continued) | | |

FOREIGN PATENT DOCUMENTS

| DE | 3742728 C1 | 3/1989 |
| DE | 19637109 C1 | 11/1997 |
| (Continued) | | |

OTHER PUBLICATIONS

European Search Report and Written Opinion as issued in connection with the European Application No. EP19217391.2, dated Apr. 28, 2020.

(Continued)

*Primary Examiner* — Kavel Singh
(74) *Attorney, Agent, or Firm* — Maschoff Brennan

(57) ABSTRACT

A cascade conveyor for sorting and conveying container closures, such as for conveying and sorting screw closures in a drinks filling installation, comprising at least one sorting bar which can be moved in a conveying direction and which is orientated transversely relative to the conveying direction for conveying the container closures from a collection receptacle which receives unsorted container closures to a closure unloading zone. There may also be provided in the closure unloading zone a conveyor belt which extends when viewed in the gravitational direction below the sorting bar in order to laterally discharge container closures conveyed by the sorting bar.

20 Claims, 4 Drawing Sheets

(56) References Cited

U.S. PATENT DOCUMENTS

| | | | | | |
|---|---|---|---|---|---|
| 3,924,732 | A | * | 12/1975 | Leonard | B65G 47/1471 198/404 |
| 4,099,609 | A | * | 7/1978 | Kieronski | B65G 47/1471 193/47 |
| 4,225,034 | A | * | 9/1980 | Sarovich | B65G 17/12 198/607 |
| 7,040,489 | B2 | * | 5/2006 | Zemlin | B65G 47/1471 198/384 |
| 8,783,439 | B2 | | 7/2014 | Lopez et al. | |

FOREIGN PATENT DOCUMENTS

| | | | | | |
|---|---|---|---|---|---|
| DE | 10149510 | A1 | | 4/2003 | |
| DE | 10341481 | A1 | * | 4/2005 | B65G 47/1471 |
| DE | 102004030667 | A1 | | 1/2006 | |
| DE | 102009015618 | A1 | | 11/2010 | |

OTHER PUBLICATIONS

European Search Report and Written Opinion as issued in connection with DE 10 2018 132 637.8, dated Nov. 13, 2019.

* cited by examiner

CASCADE CONVEYOR AND METHOD FOR SORTING AND CONVEYING CONTAINER CLOSURES

CROSS-REFERENCE TO RELATED APPLICATION

This application claims priority to German Patent Application No. 10 2018 132 637.8, filed on Dec. 18, 2018.

FIELD

The present invention relates to a cascade conveyor for sorting and conveying container closures, such as screw closures in a drinks filling installation, and a corresponding method for sorting and conveying container closures, such as screw closures in a drinks filling installation.

BACKGROUND

In drinks filling installations, it is generally known to close filled containers with container closures in order to prepare them for further processing and for transport to the consumer. Different container closures are known, such as, for example, screw closures, which are provided as a plastics material moulded component and which are screwed onto an outer thread in the opening region of the filled container. There are further known crown corks which are formed on the filled container. There are further also known so-called roll-on closures in which a closure sleeve is placed on a thread formed on the outer side of a container opening and then by means of a roll-on closure mechanism the closure sleeve is formed on the thread.

In all closure types, the container closures are supplied to a closure device or a closure mechanism for closing the filled containers with the container closures. In order to ensure that container closures produced in a separate device or installation always reach the closure device with the correct orientation, it is known to sort the container closures beforehand.

It is, for example, known to convey and sort the container closures by means of a so-called cascade conveyor. In this instance, unsorted container closures are conveyed from a collection receptacle, for example, in the form of a vessel, by means of a bar chain having a large number of sorting bars to a closure transfer unit located higher with respect to the collection receptacle. On the conveying path between the collection receptacle and the closure transfer unit, the container closures located on the sorting bars are sorted in a sorting region in which the sorting bars are inclined in such a manner that only container closures which face in the direction of the sorting bars with their base, remain in the sorting bars as a result of their centre of gravity. Container closures with a different orientation fall, as a result of their centre of gravity located outside the sorting bar, back into the collection receptacle and can be received and conveyed again by one of the sorting bars. The container closures sorted in this manner are after passing through the sorting region transferred from the closure transfer unit with the predetermined orientation to another processing device of the drinks filling installation, for example, another transport device or directly to a closure device.

In order to laterally push out the container closures from the sorting bars at the closure transfer unit, it is known to provide one or more compressed air nozzles and to laterally blow out the container closures by means of compressed air or compressed air pulses. Such a cascade conveyor can be seen, for example, in DE 10 2004 030 667 A1. The use of compressed air for pushing out, as a result of the compressed air flowing out of the nozzles, results in a high level of background noise. In addition, the compressed air has to be provided by a device provided separately for this purpose. This is complex and expensive.

There is further known from U.S. Pat. No. 3,924,732 A a cascade sorter in which closure caps are conveyed in a position-orientated manner with respect to a transversely conveying conveyor belt. In this instance, the container closures are transferred by the sorting bars from the trajectory thereof to the conveyor belt arranged beside the cascade conveyor. Defective container closures, for example, bent closures, may in this instance remain suspended in the cover rail at the transfer location and thus cause a stoppage. Furthermore, defective closures may become jammed at the slot between the cascade conveyor and the adjacent conveyor belt, by means of which the conveyor chain is redirected, and thus also cause a stoppage of the installation.

SUMMARY

A cascade conveyor for sorting and conveying closures of containers comprising a closure unloading zone that includes a conveyor belt and at least one sorting bar movable in a conveying direction and that is orientated transversely relative to the conveying direction for conveying container closures from a collection receptacle, which receives unsorted container closures, to the closure unloading zone. In some embodiments, the conveyor belt extends, when viewed in a gravitational direction, below the sorting bar in order to laterally discharge container closures conveyed by the sorting bar.

BRIEF DESCRIPTION OF THE FIGURES

Embodiments of the invention are explained in greater detail by the following description of the Figures, in which.

DETAILED DESCRIPTION

Figure 1:
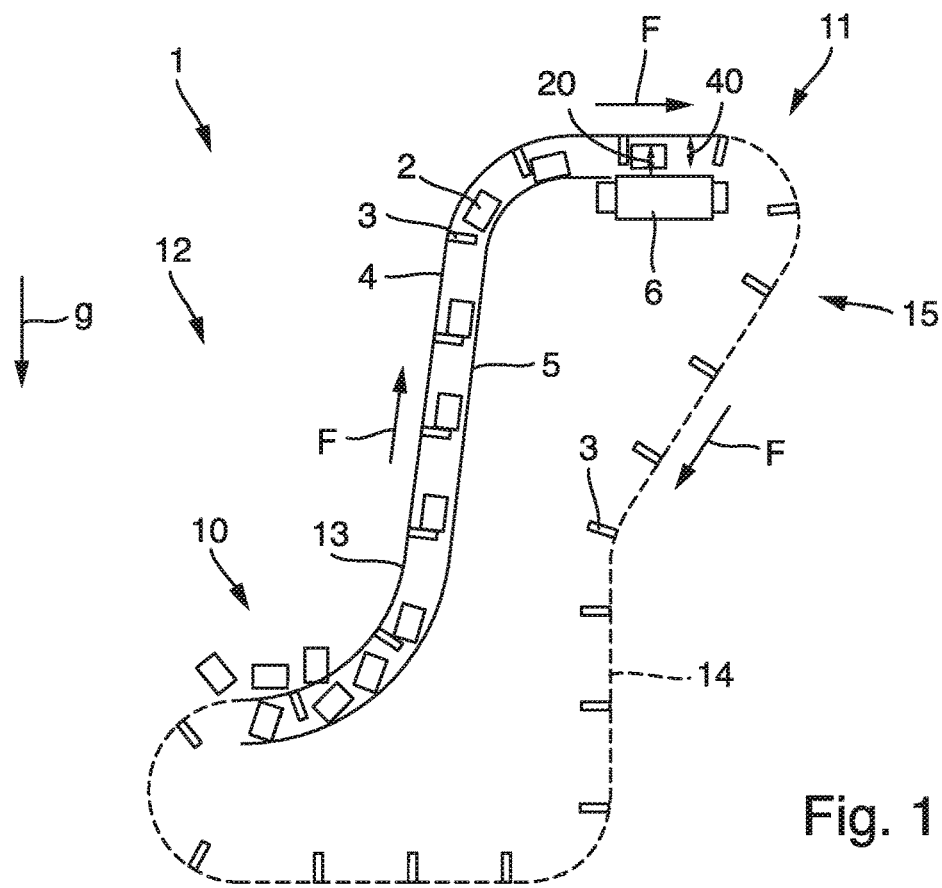
FIG. 1 is a schematic side view of a cascade conveyor for sorting and conveying container closures according to an embodiment.

Based on the known prior art, an object of the present invention is to provide an improved cascade conveyor for sorting and conveying container closures, such as conveying and sorting screw closures in a drinks installation, and a corresponding method.

The object is achieved with a cascade conveyor for sorting and conveying container closures, such as conveying and sorting screw closures in a drinks filling installation, having the features of claim 1. Additional developments will be appreciated from the dependent claims, the description and the appended Figures.

Accordingly, a cascade conveyor for sorting and conveying container closures, such as for conveying and sorting screw closures in a drinks filling installation is proposed, comprising at least one sorting bar which can be moved in a conveying direction and which is orientated transversely relative to the conveying direction for conveying the container closures from a collection receptacle which receives unsorted container closures to a closure unloading zone. The cascade conveyor is characterised in that there is provided in the closure unloading zone a conveyor belt which extends when viewed in the gravitational direction below the sorting bar in order to laterally discharge container closures conveyed by the sorting bar.

By there being provided in the closure unloading zone a conveyor belt which extends when viewed in the gravitational direction below the sorting bar for laterally discharging container closures conveyed by the sorting bar, the cascade conveyor proposed in this instance can be operated more quietly than the solutions known from the prior art. This applies to devices, in which, in order to move the container closures from the sorting bars into the discharge channel, compressed air or a suction device is used.

In addition, the risk of a stoppage of the installation as a result of jamming of a defective container closure or a blockage of container closures at the closure transfer unit required in devices from the prior art to a unit for further transport can be reduced.

A cascade conveyor which is constructed in this manner can further be constructed to be more compact than conventional cascade conveyors since the conveyor belt is not provided beside the cascade conveyor separately from it, but instead is incorporated or integrated therein.

In the closure unloading zone, the sorting bar of a cascade conveyor constructed in this manner pushes the container closures onto the conveyor belt. Since the conveyor belt is arranged in the gravitational direction below the sorting bar, the container closures rest with their weight substantially on the conveyor belt. When the conveyor belt is moved in the transport direction transversely relative to the conveying direction, the conveyor belt, as a result of the weight of the container closures and the friction between the conveyor belt and container closure, consequently moves the container closures in the transport direction so that they are moved laterally out of the region of the sorting bar, that is to say, are discharged.

The cascade conveyor has a number of sorting bars which are arranged substantially one behind the other. It is thereby possible for the cascade conveyor to convey in accordance with the number of sorting bars a correspondingly larger number of container closures simultaneously.

According to a further embodiment, the sorting bar extends completely across the conveyor belt in the conveying direction. It has been found that a further improved reliability of the cascade conveyor with regard to discharging the container closures from the sorting bar may thereby be possible.

The conveyor belt can be moved in a transport direction, wherein the transport direction and the conveying direction form an angle greater than 0°, or greater than 0° to less than or equal to 120°. That is to say, the term "transversely relative to the conveying direction" is intended to be understood in such a manner that the conveying direction forms with the transport direction an angle not equal to 0°. It can thereby be ensured that the container closures conveyed by the sorting bar in the closure unloading zone are discharged laterally from the sorting bar when viewed in the conveying direction.

According to an embodiment, the angle has a value between 90° and 105°, preferably a value between 90° and 100°, in a particularly preferred manner 95° or 100°.

If the angle between the conveying direction and transport direction is according to an embodiment not equal to 90°, it is possible for the conveyor belt not to come into contact at the same time with all the container closures conveyed by a sorting bar, but instead for this to be carried out in a time-delayed manner. It is thereby possible to ensure that the conveyor belt accordingly begins to transport the individual container closures in a time-delayed manner. It is thereby possible, for example, to reduce or even completely prevent occurrences of blockages of container closures.

An embodiment which is particularly advantageous with respect to discharging the container closures from the sorting bar by the conveyor belt is produced when the conveyor belt is orientated in a substantially horizontal manner Since the sorting bar of the container closures continues to move through the conveyor belt over the conveyor belt, as a result of this movement of the sorting bar there is a displacement of the container closures on the conveyor belt transversely relative to the transport direction. With a horizontal orientation of the conveyor belt, a good relationship between a discharge behaviour by the conveyor belt and a displaceability of the container closures on the conveyor belt in the conveying direction can be produced.

According to a further embodiment, the sorting bar can be moved along a trajectory which comprises the collection receptacle, a sorting region and the closure unloading zone, wherein the trajectory in the region of the closure unloading zone, in comparison with the sorting region which is arranged upstream in the conveying direction, has a smaller inclination, and wherein in particular the trajectory in the region of the closure unloading zone has an inclination angle between 0° and 30°, or 0° and 5°, wherein, in a particularly manner, the trajectory is orientated horizontally in the region of the conveyor belt.

In the sorting region, the trajectory of the cascade conveyor which is provided with the sorting bars has sufficient inclination to enable a sorting of the container closures received in the sorting bars using gravitational force. This is carried out, as a result of an asymmetrical centre of gravity of the container closures when passing through the sorting region, by only the container closures which have a correct or predetermined orientation being retained in the sorting bars. Incorrectly orientated container closures fall in contrast, as a result of their centre of gravity which is arranged outside the sorting bar, back into the collection receptacle. In order to promote incorrectly orientated container closures falling from the sorting bar, an abrupt movement of the sorting bars can be brought about in the sorting region. This may, for example, be achieved by a sorting threshold in the trajectory of the cascade conveyor.

In order to ensure that all container closures conveyed and sorted by the sorting bar are discharged by the conveyor belt, the conveyor belt extends over the entire width of the sorting bar transversely relative to the conveying direction.

The conveyor belt extends further when viewed in the transport direction beyond the width of the sorting bar along an evacuation portion for evacuating container closures which have been discharged from the sorting bar. It is thereby possible using the conveyor belt to further provide onward transport of the discharged container closures, for example, to a closure store and/or a container closure device in which containers are closed with the container closures. It is thereby possible to dispense with an additional transport unit which is required in the prior art and which is intended to be provided between the cascade conveyor and the closure store or the container closure device. Consequently, a cascade conveyor which is constructed in this manner contributes to a simplified construction of an installation which is provided with such a cascade conveyor.

A support for guiding the container closures during conveying extends through the sorting bar at least between the collection receptacle and the conveyor belt, wherein the support substantially forms the trajectory, wherein the conveyor belt when viewed in the conveying direction directly adjoins the support and/or the support partially overlaps the conveyor belt. As a result of the support, a guiding of the container closures during the transport and sorting of the container closures can be provided by the sorting bar. That is to say, by means of the sorting bar and the support a movement path of the container closures can be predetermined. The movement path corresponds in this instance to the trajectory.

In order to convey the sorting bar, a conveyor unit, a conveyor chain, is provided, wherein the conveyor unit when viewed in the gravitational direction is arranged above the support which extends at least between the collection receptacle and the conveyor belt in order to guide the container closures during conveying through the sorting bar.

The sorting bar extends from the conveyor unit in the direction of the support, wherein the sorting bar is conveyed with a predetermined spacing with respect to the support and/or the conveyor belt by means of the conveyor unit, and/or the sorting bar at least in a part-region of the trajectory rests on the support and/or is guided thereon.

At least in the region of the conveyor belt, the conveyor unit has at least at the side of the sorting bar on which the container closures are discharged from the sorting bar, a spacing with respect to the conveyor belt which is greater than a maximum height of the container closures conveyed and sorted by the sorting bar. The spacing is in this instance sized in such a manner that it contains the maximum height and additionally a safety amount or a predetermined tolerance value.

According to a further embodiment, the conveyor unit may have along the trajectory between the collection receptacle and the conveyor belt with respect to the support and/or the conveyor belt a predetermined spacing which may be consistent. It is thereby possible for the transport and the sorting of the container closures to be carried out in a particularly uniform manner.

The sorting bar may have a return transport path which adjoins the trajectory, wherein the trajectory and the return transport path form a closed movement curve. The cascade conveyor may consequently be provided in the form of a continuous cascade conveyor. In the context of the present disclosure, the term "continuous cascade conveyor" describes a continuous conveyor which can be actuated continuously in the conveying direction. To this end, the cascade conveyor or the conveyor unit may be moved along the closed movement curve. For example, the conveyor unit can be moved continuously around at least two redirection rollers.

In order to achieve a particularly compact construction of the cascade conveyor, the conveyor belt can be surrounded by the movement curve. In this embodiment, the return transport path is consequently arranged when viewed in the rotation direction substantially below the trajectory.

In an alternative embodiment, the return transport path may when viewed in the gravitational direction extend substantially above the trajectory. According to this embodiment, the sorting bars can be moved upwards away from the conveyor belt so that the risk of an above-described jamming can be further reduced.

According to a further embodiment, an inspection unit for inspecting container closures which are transported on the conveyor belt and which have been discharged from the sorting bar is provided. As a result of the inspection unit, for example, incorrectly orientated, dirty or defective, for instance, bent or deformed container closures can be identified.

The inspection unit communicates with a removal unit for removing discharged container closures from the conveyor belt, wherein the removal unit is configured to remove discharged container closures which have been identified by the inspection unit as incorrectly orientated on the conveyor belt and/or as defective from the conveyor belt. It has been found to be advantageous for the removal unit to have to this end a mechanical ejector or a pneumatic ejector which ejects or removes a container closure which has been identified as defective transversely relative to the transport direction from the conveyor belt.

In a development, the removal unit may also have more than one ejector and/or have a switch so that incorrectly orientated but otherwise correctly constructed container closures can be guided back into the collection receptacle and defective, for example, contaminated container closures can be discarded and/or supplied to a cleaning device for container closures.

According to a further embodiment, the trajectory may also only have the collection receptacle and the closure unloading zone if an inspection unit and a removal unit are provided. The cascade conveyor may then only be configured to convey the container closures so that, after the container closures have been discharged by the conveyor belt, the discharged container closures have on the conveyor belt a spacing from each other which is substantially identical or at least similar. The sorting can then be carried out completely by a combination of the inspection unit and removal unit. A cascade conveyor which is constructed in this manner may be constructed to be particularly compact since the region of the sorting bar in which in particular vertical conveying is carried out may be saved.

The above-mentioned object is further achieved by a method for sorting and conveying container closures, such as for conveying and sorting screw closures in a drinks filling installation having the features of claim 14. Developments will be appreciated from the dependent claims, the description and the Figures.

Accordingly, a method for sorting and conveying container closures, such as for conveying and sorting screw closures in a drinks filling installation, is proposed, comprising the conveying of the container closures by means of at least one sorting bar which can be moved in a conveying direction and which is orientated transversely relative to the conveying direction from a collection receptacle which receives unsorted container closures to a closure unloading zone. In the closure unloading zone, a lateral discharge of the conveyed container closures is carried out by means of a conveyor belt which extends when viewed in the gravitational direction below the sorting bar.

As a result of the method, the advantages and effects which are described with respect to the device are achieved in a similar manner.

Embodiments are described below with reference to the Figures. In this instance, elements which are identical, similar or have the same effect are given identical reference numerals in the different Figures and a repeated description of these elements is partially omitted in order to prevent redundancies.

FIG. 1 is a schematic side view of a cascade conveyor 1 for sorting and conveying container closures 2 according to an embodiment. The cascade conveyor 1 comprises a large number of sorting bars 3 which can be moved in a conveying direction F and which are orientated transversely relative to the conveying direction F for conveying the container closures 2 from a collection receptacle 10 which receives unsorted container closures 2 to a closure unloading zone 11.

The sorting bars 3 can be moved along a trajectory 13 which comprises the collection receptacle 10 sorting region 12 and the closure unloading zone 11. When viewed in the conveying direction F, the trajectory 13 is adjoined by a return transport path 14 in which sorting bars 3 which have passed through the closure unloading zone 11, are conveyed back to the collection receptacle 10. The trajectory 13 and the return transport path 14 form in this instance a closed movement curve 15. The cascade conveyor 1 is consequently constructed as a continuous cascade conveyor.

The sorting bars 3 are constructed to receive in each case a plurality of container closures 2 from the collection receptacle 10 and to transport them to the closure unloading zone 11. In this instance, the sorting bars 3 pass through the sorting region 12 with a sorting of the container closures 2 received in the sorting bars 3 being carried out. To this end, the sorting bars 3 are conveyed in the sorting region 12 in such a manner that only container closures 2 which with the base thereof in the direction of a support 5, via which the container closures 2 are guided in a sliding manner by the sorting bars 3 on their way from the collection receptacle 10 to the closure unloading zone 11, remain in the sorting bars 3 as a result of their centre of gravity. Container closures 2 with a different orientation and accordingly with a centre of gravity located outside the sorting bar 3 fall back into the collection receptacle 10 again and can be received and conveyed again by one of the sorting bars 3 when passing through the collection receptacle 10.

Figure 3:
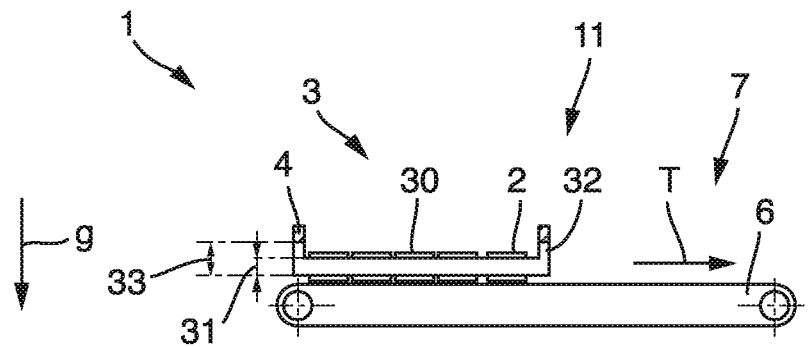
FIG. 3 is a schematic front view of the closure unloading zone from FIG. 2.

The sorting bars 3 are constructed identically and each have a central bar 30 which extends transversely relative to the conveying direction F, as shown in greater detail in FIG. 3.

In order to convey the sorting bars 3, a conveyor unit which is in this instance constructed as a conveyor chain 4 is provided. The conveyor chain 4 is when viewed in the gravitational direction g arranged above the support 5 which extends from the collection receptacle 10 to the closure unloading zone 11.

In the closure unloading zone 11, there is provided a horizontally orientated conveyor belt 6 which when viewed in the gravitational direction g extends below the conveyor chain 4 and the sorting bars 3 which are secured thereto. The conveyor belt 6 is in this instance provided for laterally discharging container closures 2 conveyed by the sorting bars 3.

The support 5 forms the trajectory 13, wherein the conveyor belt 6 when viewed in the conveying direction F directly adjoins the support 5.

The conveyor belt 6 is in this instance surrounded by the movement curve 15. Furthermore, the conveyor belt 6 is incorporated in the cascade of the cascade conveyor 1 or integrated therein.

Figure 2:
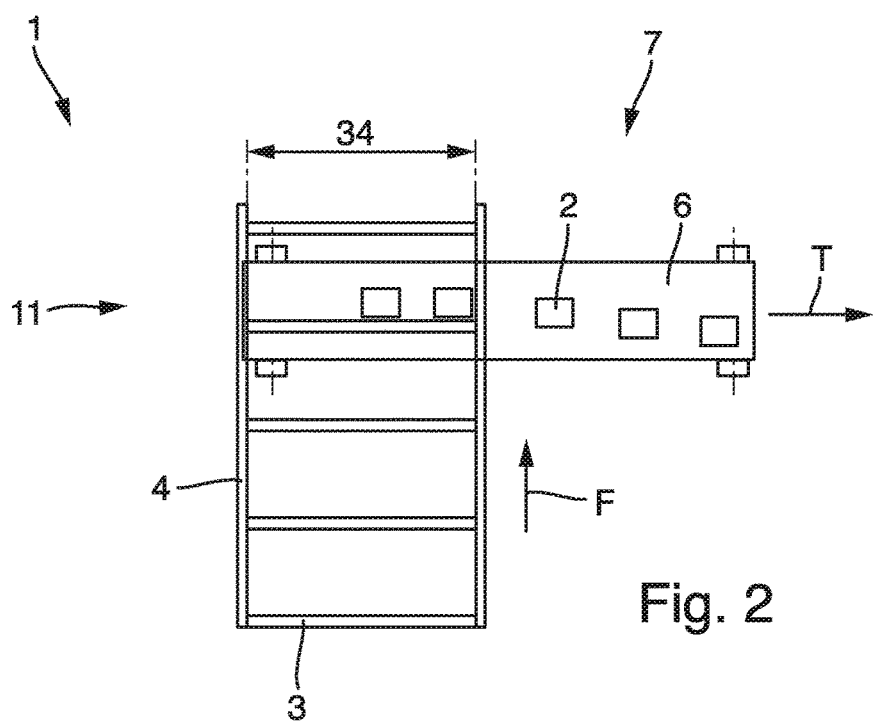
FIG. 2 is a schematic plan view of a closure unloading zone of the cascade conveyor from FIG. 1.

FIG. 2 is a schematic plan view of the closure unloading zone 11 of the cascade conveyor 1 from FIG. 1. From this view, it can be clearly seen that the conveyor belt 6 which transports the container closures 2 in a transport direction T is arranged transversely relative to the conveying direction F. According to this embodiment, the transport direction T which corresponds to a main orientation of the conveyor belt 6 is orientated substantially perpendicularly to the conveying direction F.

If a sorting bar 3 from the region in which it pushes the container closures 2 over the support 5, as can be seen in FIG. 1, reaches the region of the conveyor belt 6, this sorting bar 3 pushes the container closures 2 which are conveyed by it onto the conveyor belt 6 so that the container closures 2 rest with their weight on the conveyor belt 6.

As a result of the movement of the conveyor belt 6 in the transport direction T, the container closures 2 are subjected to a movement in the direction of the transport direction T, consequently laterally or transversely relative to the conveying direction F. This results in the container closures 2 being moved laterally out of the region of the sorting bar 3, that is to say, being discharged.

The conveyor belt 6 extends additionally in the transport direction T, beyond the sorting bars 3 and forms in addition to the region formed by the sorting bars 3 and the conveyor chain 4 an evacuation portion 7, in which the discharged container closures 2 are transported further in the transport direction T.

In order to ensure that all the container closures 2 which are conveyed by the respective sorting bar 3 are discharged from the sorting bar 3, as can be seen in FIG. 2, the conveyor belt 6 extends over the entire width 34 of the sorting bars 3.

FIG. 3 is a schematic front view of the closure unloading zone 11 from FIG. 2. Consequently, this view corresponds to a cut-out of a sectioned view of the cascade conveyor 1 parallel with the transport direction T.

As can already be seen in FIG. 1, the conveyor chain 4 has in the region of the conveyor belt 6 with respect thereto a distance 40 which is greater than the height 20 of the sorted container closures 2. In this instance, the distance 40 is sized in such a manner that it is a sum of the maximum height 20 of the container closures 2 and an additional safety amount, in this instance 20% of the height 20.

As a result of the fact that the distance 40 is greater than the height 20, the container closures 2 can be transported by the conveyor belt 6 in the transport direction T laterally out of the region of the sorting bar 3 without colliding with the conveyor chain 4.

In order to nonetheless ensure that the container closures 2 are conveyed through the sorting bars 3, the sorting bars 3 extend from the conveyor chain 4 in the direction of the support 5.

The sorting bars 3 are in this instance subdivided into a central bar 30 and connection portions 32 which adjoin both ends of the central bar 30. The connection portions 32 have an extent 33 which is greater than a height 31 of the central bar 30. The central bar 30 is consequently spaced apart from the conveyor chain 4 when viewed in the direction towards the support 5. The side of the central bar 30 which is directed away from the support 5 has in this instance with respect to the support 5 a spacing which is smaller than the height 20 of the container closures 2. This spacing is additionally smaller than a spacing of the centre of gravity of a container closure 2 when it is not orientated with the base thereof in the direction towards the support 5. It is thereby possible for incorrectly orientated container closures 2 in the sorting region 12 to fall as a result of gravitational force from the sorting bars, although the distance 40 of the conveyor chain 4 is greater than the height 20 of the container closures 2.

Alternatively or additionally, the distance of the conveyor chain 4 relative to the support 5 may be reduced at least in the region of the sorting region 12 so that the tipping-out of incorrectly orientated container closures 2 as described above is additionally supported. At the latest in the region of the conveyor belt 6, the conveyor chain 4 is intended to be lifted to the distance 40 thereof in such a manner that the container closures 2 can be laterally discharged from the sorting bars 3 by the conveyor belt 6.

Figure 4:
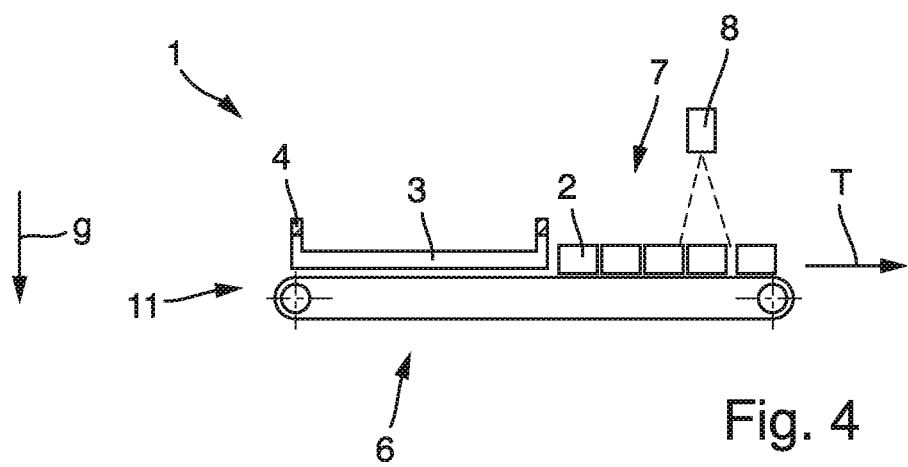
FIG. 4 is a schematic front view of a closure unloading zone of a cascade conveyor according to another embodiment.

FIG. 4 is a schematic front view of a closure unloading zone 11 of a cascade conveyor 1 according to another embodiment. The cascade conveyor 1 substantially corresponds to what was described in FIGS. 1 to 3. However, the cascade conveyor 1 according to FIG. 4 has in addition an inspection unit 8 for inspecting container closures 2 which are transported on the conveyor belt 6 and which have been discharged from the sorting bar 3. The inspection unit 8 is connected in terms of communication to a removal unit which is not shown in this Figure for removing discharged container closures 2 from the conveyor belt 6.

Figure 5:
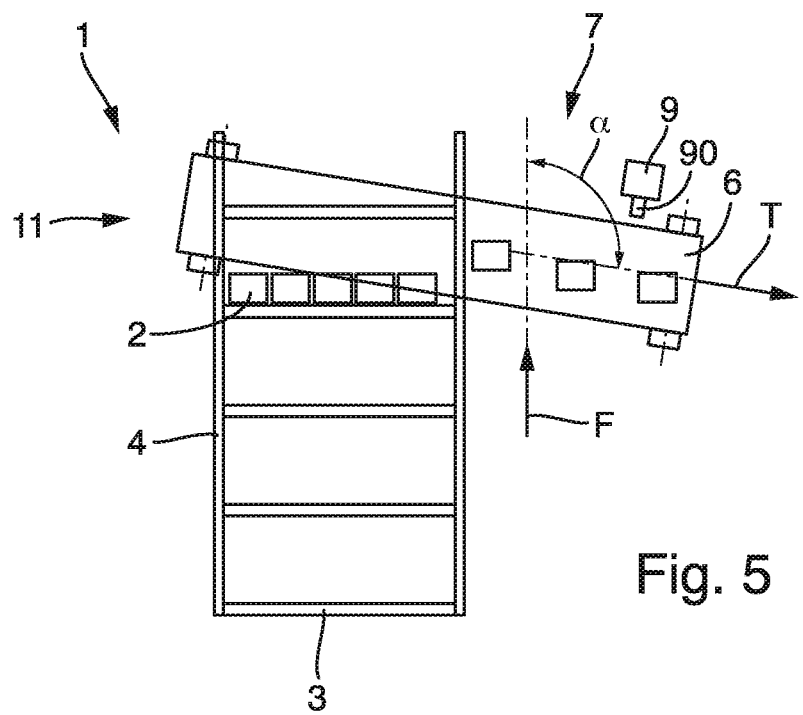
FIG. 5 is a schematic plan view of a closure unloading zone of a cascade conveyor according to another embodiment.

As a result of the inspection unit 8, incorrectly orientated, contaminated or defective, for example, bent container closures 2 can be identified. The removal unit is in turn configured as a result of the inspection unit 8 to remove discharged container closures 2 which have been identified as incorrectly orientated on the conveyor belt 6 and/or defective from the conveyor belt 6. It has to this end a mechanical ejector or a pneumatic ejector which ejects a container closure 2 which has been identified as defective transversely relative to the transport direction T from the conveyor belt 6 when this container closure 2 is guided past the removal unit. In FIG. 5, a removal unit 9 is shown together with the ejector 90.

FIG. 5 is a schematic plan view of a closure unloading zone 11 of a cascade conveyor 1 according to another embodiment. The cascade conveyor 1 substantially corresponds to that of FIG. 1.

In this instance, the conveyor belt 6 which is arranged transversely relative to the conveying direction F or the transport direction T and the conveying direction F form an angle α which is not equal to 90°. In this instance, the angle is 100°. That is to say, the transport direction T is inclined through 10° with respect to the perpendicular relative to the conveying direction F or through 10° with respect to a longitudinal extent of the sorting bars 3 in the region of the conveyor belt 6 counter to the conveying direction F.

The container closures 2 which have been conveyed through a sorting bar 2 thereby do not all come into contact with the conveyor belt 6 at the same time, but instead in a time-delayed manner in accordance with the inclination of the conveyor belt 6 with respect to the perpendicular of the conveying direction F. Accordingly, not all container closures 2 are gripped at the same time by the conveyor belt 6, but instead with a slight time delay successively one after the other.

Figure 6:
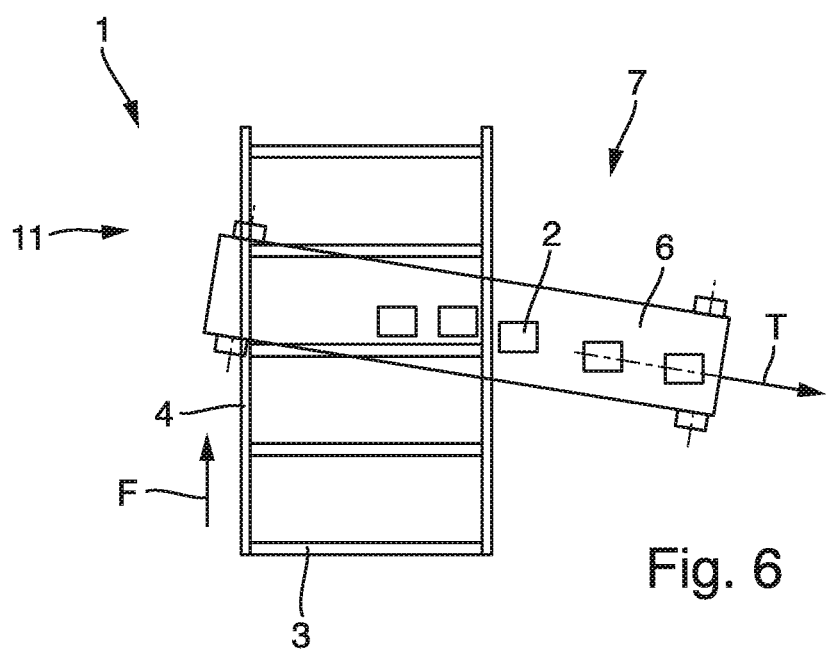
FIG. 6 is another schematic plan view of the closure unloading zone from FIG. 5.

FIG. 6 is another schematic plan view of the closure unloading zone 11 from FIG. 5, wherein the container closures 2 have already been subjected to transport by the conveyor belt 6. In comparison with the arrangement of the container closures 2 in FIG. 5, it can be clearly seen that the spacing of adjacent container closures 2 by transporting by means of the conveyor belt 6 in comparison with the position thereof in the state conveyed by the sorting bar 3 is increased. As a result of this increase of the spacing of adjacent container closures 2, the further processing or further handling of these container closures 2 can be facilitated in comparison with container closures which are placed close beside each other.

Figure 7:
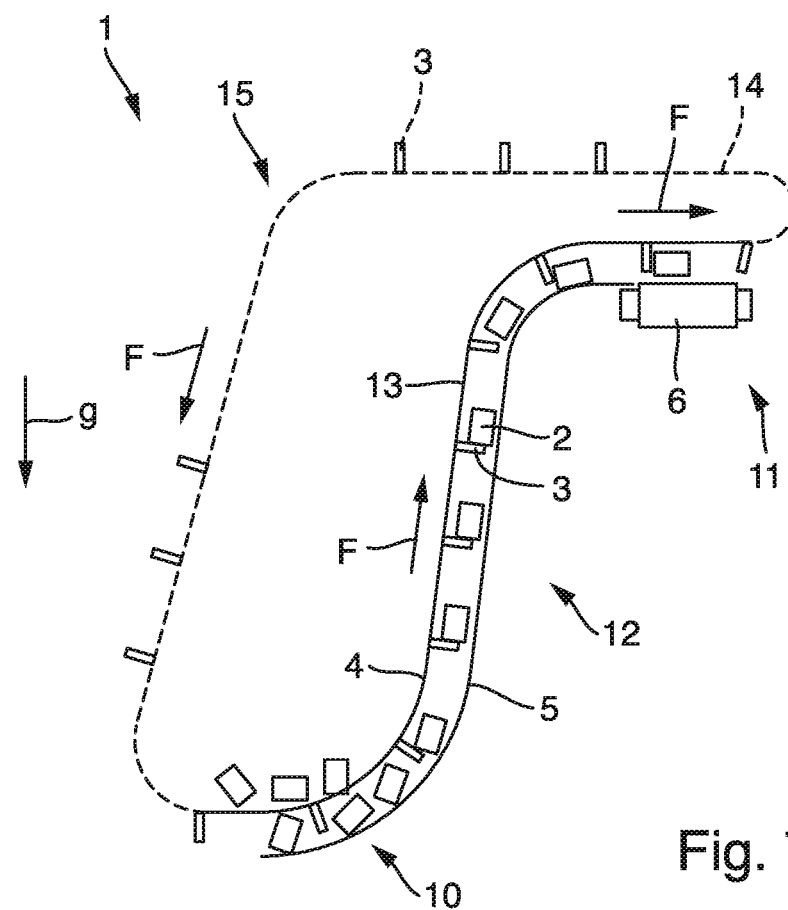
FIG. 7 is a schematic side view of a cascade conveyor according to another embodiment.

FIG. 7 is a schematic side view of a cascade conveyor 1 according to another embodiment. The cascade conveyor 1 substantially corresponds in terms of its structure to the one from FIG. 1, wherein in contrast to this one, the return transport path 12 when viewed in the direction of gravitational force extends substantially above the trajectory 13. According to this embodiment, the sorting bars 3 are moved upwards away from the conveyor belt 6.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

Wherever applicable, all the individual features which are set out in the embodiments can be combined with each other and/or exchanged without departing from the scope of the invention.

The invention claimed is:

1. A cascade conveyor for sorting and conveying closures of containers, comprising:
   a closure unloading zone that includes a conveyor belt movable in a transport direction;
   at least one sorting bar movable in a conveying direction that is different from the transport direction, the sorting bar orientated transversely relative to the conveying direction for conveying container closures from a collection receptacle, which receives unsorted container closures, to the closure unloading zone; and
   a support configured to guide the container closures during conveying by the sorting bar, the support extending at least between the collection receptacle and the conveyor belt, wherein the conveyor belt when viewed in the conveying direction directly adjoins the support or the support partially overlaps the conveyor belt,
   wherein the conveyor belt extends, when viewed in a gravitational direction, below the sorting bar in order to laterally discharge container closures conveyed by the sorting bar.

2. The cascade conveyor of claim 1, wherein the sorting bar extends across the conveyor belt in the conveying direction.

3. The cascade conveyor of claim 2, wherein the sorting bar extends completely across the conveyor belt.

4. The cascade conveyor of claim 1, wherein the transport direction and the conveying direction form an angle greater than 0° and less than or equal to 120°.

5. The cascade conveyor of claim 4, wherein the transport direction and the conveying direction form an angle between 90° and 105°.

6. The cascade conveyor of claim 4, wherein the conveyor belt extends in the transport direction beyond a width of the sorting bar along an evacuation portion for evacuating the container closures that have been discharged from the sorting bar.

7. The cascade conveyor of claim 1, wherein the conveyor belt is orientated in a substantially horizontal manner.

8. The cascade conveyor of claim 1, wherein the conveyor belt extends over an entire width of the sorting bar transversely relative to the conveying direction.

9. The cascade conveyor of claim 1, further comprising:
   an inspection unit for inspecting the container closures that are transported on the conveyor belt and that have been discharged from the sorting bar; and
   a removal unit configured to remove discharged container closures from the conveyor belt, wherein the inspection unit is configured to communicate with the removal unit and the removal unit is configured to remove the discharged container closures from the conveyor belt that are identified by the inspection unit as incorrectly orientated on the conveyor belt and/or as defective.

10. The cascade conveyor of claim 1, wherein
   the sorting bar is movable along a trajectory that includes the collection receptacle, a sorting region, and the closure unloading zone,
   the trajectory, in a region of the closure unloading zone, has a smaller inclination than the sorting region that is arranged upstream in the conveying direction, and
   the trajectory in the region of the closure unloading zone has an inclination angle between 0° and 30°.

11. The cascade conveyor of claim 10, wherein the sorting bar has a return transport path which adjoins the trajectory, wherein the trajectory and the return transport path form a closed movement curve.

12. The cascade conveyor of claim 11, wherein the conveyor belt is surrounded by the movement curve.

13. The cascade conveyor of claim 11, wherein the return transport path when viewed in the gravitational direction extends substantially above the trajectory.

14. The cascade conveyor of claim 10, wherein the support substantially forms the trajectory.

15. The cascade conveyor of claim 14, further comprising a conveyor chain configured to convey the sorting bar, wherein the conveyor chain when viewed in the gravitational direction is arranged above the support that extends at least between the collection receptacle and the conveyor belt in order to guide the container closures during conveying through the sorting bar.

16. The cascade conveyor of claim 15, wherein the sorting bar extends from the conveyor chain in a direction of the support, wherein the sorting bar is conveyed with a particular spacing with respect to the support by the conveyor chain.

17. The cascade conveyor of claim 15, wherein the sorting bar extends from the conveyor chain in a direction of the support and the sorting bar, at least in a part-region of the trajectory, rests on the support and/or is guided by the support.

18. The cascade conveyor of claim 15, wherein the conveyor chain along the trajectory between the collection receptacle and the conveyor belt with respect to the support and/or the conveyor belt has a particular distance, wherein a distance of the conveyor chain, at least in a region of the conveyor belt at a side of the sorting bar on which the container closures are discharged, is greater than a height of the container closures.

19. A cascade conveyor for sorting and conveying closures of containers, comprising:
   a closure unloading zone that includes a conveyor belt;
   at least one sorting bar movable in a conveying direction and that is orientated transversely relative to the conveying direction for conveying container closures from a collection receptacle, which receives unsorted container closures, to the closure unloading zone, wherein
the conveyor belt extends, when viewed in a gravitational direction, below the sorting bar in order to laterally discharge container closures conveyed by the sorting bar,
the conveyor belt is movable in a transport direction that is different from the conveying direction such that the transport direction and the conveying direction form an angle greater than 90° and less than or equal to 120°,
the sorting bar is movable along a trajectory that includes the collection receptacle, a sorting region, and the closure unloading zone,
the trajectory in a region of the closure unloading zone as compared with the sorting region, which is arranged upstream in the conveying direction, has a smaller inclination, and
the trajectory in the region of the closure unloading zone has an inclination angle between 0° and 30°; and
a support configured to guide the container closures during conveying, the support extending at least between the collection receptacle and the conveyor belt, wherein the support substantially forms the trajectory and the conveyor belt when viewed in the conveying direction directly adjoins the support or the support partially overlaps the conveyor belt.

20. A method for sorting and conveying closures for containers, the method comprising:
conveying container closures by at least one sorting bar which is movable in a conveying direction and that is orientated transversely relative to the conveying direction from a collection receptacle that receives unsorted container closures to a closure unloading zone;
guiding the container closures during the conveying by a support; and
laterally discharging, in the closure unloading zone, the container closures by a conveyor belt that is movable in a transport direction that is different from the conveying direction and that when viewed in a gravitational direction extends below the sorting bar,
wherein the support extends at least between the collection receptacle and the conveyor belt, wherein the conveyor belt when viewed in the conveying direction directly adjoins the support or the support partially overlaps the conveyor belt.

* * * * *